April 30, 1940.　　　H. F. KHOENLE　　　2,199,001

ARTIFICIAL FISH BAIT

Filed Jan. 25, 1938

INVENTOR
HERMAN F. KHOENLE

BY Albert L. Ely

ATTORNEY

Patented Apr. 30, 1940

2,199,001

UNITED STATES PATENT OFFICE 2,199,001

ARTIFICIAL FISH BAIT

Herman F. Khoenle, Akron, Ohio, assignor to The Enterprise Manufacturing Company, Akron, Ohio, a corporation of Ohio Application January 25, 1938, Serial No. 186,830

14 Claims. (Cl. 43—39)

The present invention relates to the construction of artificial fish bait and to the manner of assembling and uniting the various parts or elements of an articulated bait. The invention relates particularly to the construction and manner of mounting a weed guard upon the bait body so that it is supported in correct position with respect to the hook and will be rigidly and firmly united thereto. In the form of the invention shown and described herein, a weed guard composed of horsehair or bristles is illustrated, but other forms of weed guards may be substituted if desired. The invention also has as an object a new method of securing the hair or bristles in a holder so that it cannot be loosened or pulled out of the holder. The invention may be altered or modified in other respects within the scope thereof as set forth in the appended claims.

In the drawing in which the best known or preferred form of the invention is shown:

Figure 1:
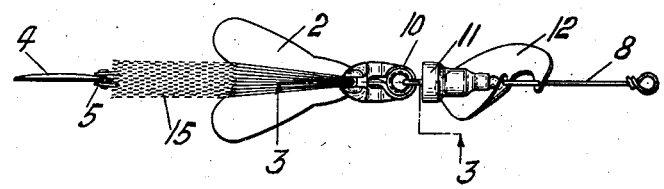
Fig. 1 is a view looking down upon a complete bait assembly embodying the various features of the invention.
Figure 2:
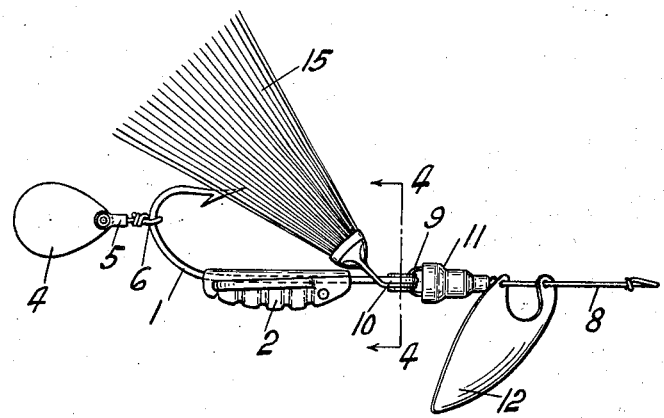
Fig. 2 is a side view thereof.
Figure 3:
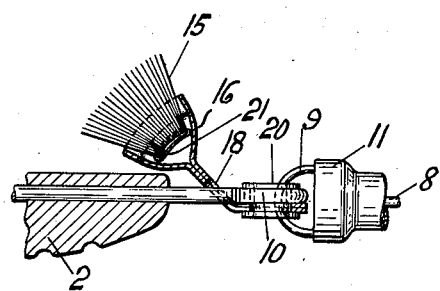
Fig. 3 is an enlarged sectional view on the line 3—3 of Fig. 1.
Figure 4:
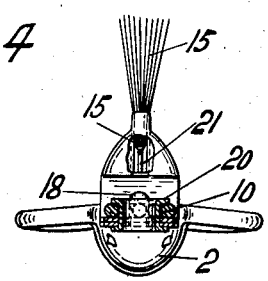
Fig. 4 is an enlarged section on the line 4—4 of Fig. 2 with part of the weed guard holder cut away to show the internal construction.

The invention will be described as shown in the drawing as this is the most desirable embodiment of the invention known to me, but it will be appreciated and understood that the invention is subject to alteration or improvement.

The bait comprises a hook of the usual type, indicated at 1, to the shank of which is secured a body, usually of cast metal, and formed to simulate a bug, minnow, or other bait attractive to fish and which may be decorated in any desirable manner to increase its lifelike appearance. In the form shown, the body 2 is cast as a bug with outstanding wings which tend to steady the bait and with an enlarged portion below the hook which tends to make the hook ride upwardly in the water. A light spinner or other added lure 4 may be carried on the rear of the hook to increase the attractiveness of the bait and also to assist in maintaining the hook upright. With the spinner as shown is associated the swivel 5 which is carried upon and rides in the bend of the hook by means of a wire loop or carrier 6.

The forward end or eye of the hook is attached to a leader, usually formed of wire 8 by means of a loop 9 which is received in the eye 10 of the hook. A bell-shaped guard 11 may be secured to the leader at the base of the wire which prevents the hook from cocking with respect to the leader and fouling the forward end of the bait. A spinner or other lure 12 may be mounted upon the wire leader and the line is secured to its forward end.

The weed guard is indicated by the numeral 15. It consists, in the form shown, of horsehair or bristles which are secured at their base in a metal socket or holder 16 having a flattened or fan-shaped extremity in which the hair is securely held. The socket is so arranged that it is flat or substantially flat with the plane of the socket vertically positioned. This distributes the hair in the plane of the hook which increases its effectiveness as a weed guard. Midway of its length the socket is bent at an angle and provided with an aperture 18 which passes over the shank of the hook. The forward end of the holder lies along and beneath the eye of the hook to which it is attached by a grommet or eye 20 which is mounted in the eye of the hook and is crimped over the holder and the eye of the hook so as to hold the assembly rigidly in position. The grommet also serves as a bearing sleeve for the loop 9.

The method of securing the hair in the holder is also novel and useful as it provides a secure means for holding the hair within the socket without any large or cumbersome binding. The hair is bent double, as shown, and wrapped at this point with a wire 21 or other binder. The assembly is then placed in a tube and the end of the tube flattened to provide the fan-shaped socket which has been described. Made in the manner described, it is impossible for the hair to be pulled out of the socket. A drop of cement or shellac could be substituted as the binding means.

The fan-shaped group of hair gives sufficient resistance to prevent the hook from engaging weeds or lily pads or the like and yet will offer no resistance to the fish. It also adds to the attractive or luring qualities of the bait and may be colored or decorated as desired.

The assembly shown and described gives a very rigid mounting for the weed guard and is inexpensive to manufacture. It is not easily bent out of form and as the hair is spread out in flattened or fan-shaped form substantially in the same plane as the curved portion of the hook, it acts as a very effective shield or guard for the hook and at the same time does not interfere with hooking the fish.

What is claimed is:

1. An artificial bait assembly comprising a hook, a bait body on the hook, a weed guard comprising a metal socket member having a flattened portion lying below the hook, an inclined portion intersecting the hook shank, and a holder for a flexible weed guard, and means for securing the flattened portion against the underside of the hook.

2. An artificial bait assembly comprising a hook, a weed guard comprising a metal socket member having a flattened portion lying below the hook, an inclined portion intersecting the hook shank, and a holder for a flexible weed guard, and means for securing the flattened portion against the underside of the hook.

3. An artificial bait assembly comprising a hook and a weed guard attached to the hook, said weed guard comprising a holder having a socket flattened in the plane of the curved portion of the hook and having a plurality of flexible elements mounted in the socket and spread in a fanwise manner in the plane of the hook.

4. An artificial bait assembly comprising a hook and a weed guard attached to the hook, said weed guard comprising a holder having a socket flattened in the plane of the curved portion of the hook and having a plurality of flexible elements mounted in the socket and spread in a fanwise manner in the plane of the hook, the holder having an intermediate portion with an aperture to receive the shank of the hook and a portion lying along the eye of the hook and secured thereto.

5. An artificial bait assembly comprising a hook and a weed guard attached to the hook, said weed guard comprising a holder having a socket flattened in the plane of the curved portion of the hook and having a plurality of flexible elements mounted in the socket and spread in a fanwise manner in the plane of the hook, an extension lying beneath the eye of the hook, and a grommet passing through the eye of the hook and the extension.

6. An artificial bait comprising a hook and a weed guard comprising a group of hair and a holder therefor comprising a flattened socket lying in the plane of the hook and projecting above the shank of the hook, an intermediate portion with an aperture to receive the shank of the hook, and an end lying beneath the eye of the hook and secured thereto.

7. An artificial bait comprising a hook and a weed guard comprising a group of hair and a holder therefor comprising a flattened socket lying in the plane of the hook and projecting above the shank of the hook, an intermediate portion with an aperture to receive the shank of the hook, an end lying beneath the eye of the hook, and a grommet passing through the eye of the hook and the end of the holder.

8. An artificial bait comprising a hook and a weed guard comprising a group of hair and a holder therefor comprising a socket projecting above the shank of the hook, an intermediate portion with an aperture to receive the shank of the hook, and an end lying beneath the eye of the hook and secured thereto.

9. An artificial bait comprising a hook and a weed guard comprising a group of hairs and a holder therefor comprising a socket projecting above the shank of the hook, and a grommet passing through the eye of the hook and the end of the holder rigidly uniting the holder and hook in determinate position with relation to each other.

10. A weed guard comprising a metal socket member, a plurality of hairs extending therefrom, the hairs being bent upon themselves, and a binder surrounding the hairs at the bend, the socket being distorted beyond the binder.

11. A weed guard comprising a metal socket member, a plurality of hairs extending therefrom, the hairs being bent upon themselves, and a binder surrounding the hairs at the bend, the socket being flattened beyond the binder.

12. A weed guard comprising a metal socket member, a plurality of hairs extending therefrom, the hairs being bent upon themselves, and a wire wrapped about the hairs at the bend, the socket being distorted beyond the wire.

13. A weed guard comprising a metal socket member, a plurality of hairs extending therefrom, the hairs being bent upon themselves, and a wire wrapped about the hairs at the bend, the socket being flattened beyond the wire.

14. A weed guard consisting of a metal socket member, a plurality of hairs bent at intermediate points and projecting beyond the socket, and a binding means at the bends of the hairs, the socket member being flattened on opposite sides of the binding means.

HERMAN F. KHOENLE.